3,274,137
ANTIFOULING PROTECTIVE COATING COMPOSITIONS

John R. Saroyan, P.O. Box 1388, Vallejo, Calif., and Hing D. Dear, 535 Grant Ave., San Francisco, Calif.
No Drawing. Filed May 4, 1962, Ser. No. 192,604
3 Claims. (Cl. 260—27)

The invention described herein may be manufactured and used by or for the Government of the United States of America for governmental purposes without the payment of any royalties thereon or therefor.

The present application is a continuation-in-part of our co-pending application Serial No. 5,566, filed January 29, 1960, now Patent No. 3,033,809.

This invention relates to antifouling protective coating compositions.

This invention is directed to the production of improved antifouling paints made of relatively few ingredients, relatively easy to manufacture, and exhibiting excellent film characteristics and antifouling properties during a long life. Certain of the variants of these compositions are adapted to be applied by spraying. All of the paints of this invention are adapted to be applied by brushing, rolling, and dipping.

All of the coatings of this invention are usable on surfaces not subject to relatively great flexing or distortion, such, for example, as relatively rigid surfaces exemplified by the hulls of boats and ships. Certain of the coatings of this invention are also adapted for use on surfaces subject to considerable flexing. These latter coatings have a superior capability for meeting the more stringent requirements of an antifouling composition to be used on rubber sonar domes. Such a composition for rubber sonar domes is required, in addition to its antifouling property, to provide high degrees of flexibility, adherence and durability and sufficient sound-transparency. Outstanding in the compositions of the present invention are the high degree of flexibility of, and the high concentration of toxic which can be achieved in, the resulting film. The best previously-available antifouling composition for such surfaces was the Navy Standard 15 NRL whose principal ingredients comprised a combination of elastomer, mercurous chloride, copper resinate, titanium dioxide and diatomaceous silica; this composition has certain disadvantages among which are that it is deficient in antifouling properties and is difficult to control, being susceptible to hard pigment settling.

The fundamental concept of the present invention is represented by the mixture with high polymer polyisobutylene elastomer of an antifouling toxic, which is most commonly cuprous oxide, and, if desired, of rosin or other similar cyclic acid material serving by virtue of its solubility in sea water to maintain a desired leaching rate for the toxic. Compositions made according to this concept are unique in that they are capable of bearing an extremely heavy loading of toxic while still retaining the desirable film characteristics and that, as compared to other antifouling paints, for any given loading of toxic such as cuprous oxide, the coatings of this invention exhibit markedly superior flexibility, elasticity, film integrity, and film strength.

An object of the present invention is to provide improved antifouling protective compositions.

Another object is to provide antifouling coating compositions superior in retaining desirable paint characteristics while carrying a relatively heavy loading of toxic.

A further object is to provide antifouling coating compositions adapted for use on surfaces, including rubber, subject to appreciable flexing.

An additional object is to provide antifouling coating compositions suitable for use on rubber sonar domes.

A still further object is to provide primers suitable for use with the antifouling compositions of this invention.

Other objects and many of the attendant advantages of this invention will be readily appreciated as the same becomes better understood by reference to the following detailed description.

The essential ingredients of the antifouling compositions of this invention are a high polymer polyisobutylene elastomer and a toxic. The polyisobutylene serves as a film former or binder. Under some circumstances rosin or a material of generally similar characteristics exhibiting the same order of solubility in sea water is added to the composition as a solubilizer to insure an adequate leaching rate for the toxic. The coatings made according to the invention with polyisobutylene of molecular weight of the order of that of grade 80 and upward are remarkably flexible and especially adapted for use on surfaces, such as rubber sonar domes, which are subject to appreciable flexing. Coatings made according to the invention with polyisobutylene of lower molecular weights, particularly of the order of that of grade 50 and below, are adapted for application by spraying.

The antifouling coatings of the invention exhibit excellent adhesion properties. They can be applied directly to surfaces such as wood, neoprene, and the like which are not deleteriously affected by the ingredients such as the toxic. When applied to other surfaces such as steel and natural rubber which would be affected by the ingredients, such as cuprous oxide, then suitable undercoats, primers and the like are used which protect the base surface and provide good adhesion for the antifouling coating. When used on steel, for example, an antifouling coating of the invention including cuprous oxide toxic would be applied over a chlorinated rubber undercoat which in turn can lie over a vinyl primer system of the type commonly used with vinyl antifouling paints. This primer system could consist of a coat of wash primer and three coats of vinyl anticorrosive paint which is made of vinyl resin and red lead.

The pigment suspension attained by the compositions of this invention is excellent, obviating the difficulty in that regard present in the Navy Standard 15 NRL.

A brief description will now be given of each of the principal constituents of the antifouling compositions of the invention and thereafter detailed descriptions with examples of formulations of the two major categories of coatings comprehended by the invention: flexible coatings and sprayable coatings.

Polyisobutylene elastomer embodied in this invention is available commercially and is identified by the following grades corresponding to various molecular weights: MS, MH, 15, 50, 80, 100, 120, 140, 200, etc. Badische Anilin- and Soda-Fabrik makes the polymer under the name Oppanol B, supplying it in the several grades designated as B15, B50, B100, and B200, corresponding to approximate average molecular weights, determined by the Staudinger method of, respectively, 15,000, 50,000, 100,000, and 200,000. The product is also available as manufactured by Enjay Company under the name Vistanex in various grades, the MS having an average molecular weight range calculated by the Staudinger formula of 8700–10,000, MH having a range of 10,000–11,700 and L-80, L-100, L-120, and L-140 formerly designated, respectively, as B-80, B-100, B-120, and B-140, having average molecular weights ranging, respectively, from 64,000 to 81,000, from 81,000 to 99,000, from 99,000 to 117,000, and from 117,000 to 135,000. To prevent degradation of the polyisobutylene, there is added a stabilizer, such as Deenax (di-tert-butyl-para cresol) made by the Enjay Company, which inhibits oxidation. This is used in the amount of about 0.2% by weight of polyisobutylene.

Toxic

Generally most of the antifouling toxics can be used in the compositions of this invention. The most common are certain copper and mercury compounds. Among the copper compounds, cuprous oxide is the most used; the commercial product "cement-copper," designated in military specification MIL-C-15166A as "copper pigment" is also common. It consists of very fine particles formed from copper particles, each oxidized either completely to cuprous oxide or to the extent that its exterior is constituted of a coating or layer of cuprous oxide. Cuprous sulfide, which is black, is also useful. Mercury compounds such as mercuric oxide and mercurous chloride can be employed. Mixtures of two or more of any of the toxic ingredients are other examples which can also be used.

Solubilizer

Because it can accept an exceedingly heavy loading of toxic while still maintaining the desired film characteristics, polyisobutylene is uniquely adapted to make an effective antifouling paint with a very long life. For example, some coatings made according to the invention with, for example, polymer of grade B-50 and polymer of grade B-100 have cuprous oxide in the amount of over 97% by weight of the dry film and one of the preferred embodiments using the high molecular weight grade B-100 and having numerous desirable properties has cuprous oxide in the amount of 90% by weight of the dry film. This remarkable ability makes polyisobutylene especially useful in constituting both the continuous contact, insoluble-matrix type of paint and the soluble-matrix type of paint.

The insoluble matrix type of antifouling paint is well known as one in which the film or binder is insoluble in sea water and is heavily loaded with toxic so that individual particles of toxic touch each other and as the outermost particle of toxic is leached out by the sea water each succeeding particle in turn can be leached out. The comparison of the action of such a coating with that of the soluble-matrix type coating is briefly treated in, among other sources, U.S. Patent No. 2,592,655.

A paint using an insoluble film former or binder such as polyisobutylene can be adapted to operate in the manner of a soluble matrix type of coating by adding what may be termed a solubilizer or a soluble filler. This is a material which is compatible with the film former and the toxic and dissolves in sea water at a rate to accomplish the desired leaching of toxic. In such a coating interior particles of toxic which do not form a continuous contact path to the outer surface of the coating are made reachable by the sea water by dissolution of the solubilizer particles interposed between toxic particles. Rosin is a suitable solubilizer for use in the compositions of this invention. Other cyclic acids exhibiting essentially the same rate of solution in sea water as rosin are also usable. Examples are abietic acid, Staybelite (hydrogenated rosin), naphthenic acid, Petrex acid (the resinous adduct of maleic anhydride and a monocyclic terpene possessing the p-cymeme skeleton). Mixtures of two or more solubilizers also are suitable.

Solvent

Various solvents can be used in making the paints of this invention. Mineral spirits, xylene, and mixtures thereof are examples. The proportion of solvent used is not critical: the amount is governed simply by the consistency desired for the intended method of application—spraying, brushing, rolling, dipping.

Flexible coatings

As previously indicated the higher molecular weight grades of polyisobutylene can be used to form flexible coatings particularly adapted for use on surfaces subject to considerable flexing. As is true of all the coatings of this invention, they will adhere to rubber as well as wood, steel, and other surfaces. Coatings made with these higher molecular weight grades of polyisobutylene, for example grade 80 and upward, cannot be successfully sprayed but are applied by brushing, rolling, or dipping. The higher the molecular weight of the elastomer, the more flexible is the coating with the same pigment loading and the tougher and more elastic is the product. It has been found that different grades of polymer can be employed to achieve satisfactory properties of the final composition. For example, while Vistanex B-100 yields preferred embodiments, Vistanex B-80 and B-120, for example, yield excellent results.

Table I below represents various "formulations" made to explore the effects of various proportions of Vistanex, copper-type pigment, rosin and paint thinner:

TABLE I.—INGREDIENTS IN POUNDS/100 GALS. PAINT

| Formula No. | Pyro[1] Cu$_2$O | Elec[2] Cu$_2$O | Cement[3] Copper | Vistanex B-100 | Rosin | P. |
|---|---|---|---|---|---|---|
| 1 | 854 | | | 29.2 | 156.2 | 413 |
| 2 | 678 | | | 34.8 | 110.3 | 466 |
| 3 | 562 | | | 38.5 | 80.0 | 502 |
| 4 | 480 | | | 41.1 | 58.6 | 526 |
| 5 | 419 | | | 43.1 | 42.6 | 545 |
| 6 | 372 | | | 44.5 | 30.2 | 559 |
| 7 | 1,169 | | | 30.0 | 106.9 | 406 |
| 8 | 923 | | | 35.6 | 70.4 | 462 |
| 9 | 763 | | | 39.2 | 46.5 | 499 |
| 10 | 650 | | | 41.7 | 29.7 | 524 |
| 11 | 566 | | | 43.6 | 17.3 | 544 |
| 12 | 1,501 | | | 30.8 | 54.9 | 399 |
| 13 | 1,180 | | | 36.3 | 28.8 | 458 |
| 14 | 970 | | | 39.9 | 11.8 | 496 |
| 15 | 825 | | | 42.4 | 0 | 522 |
| 16 | 1,733 | | | 31.4 | 18.7 | 394 |
| 17 | 1,355 | | | 36.9 | 0 | 455 |
| 3A | | 539 | | 38.5 | 80.0 | 502 |
| 6A | | 357 | | 44.5 | 30.2 | 559 |
| 8A | | 886 | | 35.6 | 70.4 | 462 |
| 10A | | 623 | | 41.7 | 29.7 | 524 |
| 3B | | | 634 | 38.5 | 80.0 | 502 |
| 6B | | | 419 | 44.5 | 30.2 | 559 |
| 8B | | | 1,041 | 35.6 | 70.4 | 462 |
| 10B | | | 733 | 41.7 | 29.7 | 524 |

CALC'D. PARTS BY VOLUME IN DRY FILM

| Formula No. | Cu$_2$O | Vistanex | Rosin |
|---|---|---|---|
| 1 | 45 | 10 | 45 |
| 2 | 45 | 15 | 40 |
| 3 | 45 | 20 | 35 |
| 4 | 45 | 25 | 30 |
| 5 | 45 | 30 | 25 |
| 6 | 45 | 35 | 20 |
| 7 | 60 | 10 | 30 |
| 8 | 60 | 15 | 25 |
| 9 | 60 | 20 | 20 |
| 10 | 60 | 25 | 15 |
| 11 | 60 | 30 | 10 |
| 12 | 75 | 10 | 15 |
| 13 | 75 | 15 | 10 |
| 14 | 75 | 20 | 5 |
| 15 | 75 | 25 | 0 |
| 16 | 85 | 10 | 5 |
| 17 | 85 | 15 | 0 |
| 3A | 45 | 20 | 35 |
| 6A | 45 | 35 | 20 |
| 8A | 60 | 15 | 25 |
| 10A | 60 | 25 | 15 |
| 3B | 45 | 20 | 35 |
| 6B | 45 | 35 | 20 |
| 8B | 60 | 15 | 25 |
| 10B | 60 | 25 | 15 |

All paints contain from .06 to .09 lbs. Deenax stabilizer (Enjay Co.; di-tert-butyl P cresol).

[1] Pyrometallurgical Cuprous oxide (C. K. Williams Co.).
[2] Electrolytic process cuprous oxide.
[3] Copper-cuprous oxide pigment.

Table II below is a summary of test results of these various formulations and of comparative test results of Navy Standard 15 NRL.

TABLE II.—SUMMARY OF RESULTS OF TEST ON POLYISOBUTYLENE A.F. PAINTS
[Rating of 1 to 5 (1=best)]

| Paints (Formula No.) | Paint Film | Anti-fouling | Pigment Suspension | Distensibility |
|---|---|---|---|---|
| 1 | 1 | 2 | 4 | 5 |
| 2 | 1 | 2 | 4 | 5 |
| 3 | 3 | 3 | 3 | 4 |
| 4 | 4 | 4 | 2 | 2 |
| 5 | 4 | 4 | 1 | 1 |
| 6 | 4 | 3 | 1 | 1 |
| 7 | 2 | 2 | 4 | 5 |
| 8 | 1 | 1 | 4 | 5 |
| 9 | 1 | 1 | 3 | 2 |
| 10 | 1 | 1 | 2 | 2 |
| 11 | 2 | 2 | 1 | 2 |
| 12 | 2 | 2 | 4 | 5 |
| 13 | 1 | 1 | 5 | 4 |
| 14 | 1 | 1 | 4 | 3 |
| 15 | 1 | 1 | 5 | 3 |
| 16 | 1 | 2 | 5 | 5 |
| 17 | 1 | 1 | 4 | 3 |
| 15NRL | 5 | 5 | 5 | 5 |
| 3A | 1 | 2 | 1 | 4 |
| 6A | 1 | 3 | 1 | 2 |
| 8A | 1 | 2 | 1 | 5 |
| 10A | 1 | 2 | 1 | 4 |
| 3B | 1 | 2 | 5 | 2 |
| 6B | 1 | 3 | 5 | 1 |
| 8B | 1 | 2 | 5 | 2 |
| 10B | 1 | 2 | 5 | 2 |
| 3-80 [1] | 1 | 1 | 4 | 1 |
| 8-80 | | | 4 | 4 |
| 10-80 | 1 | 2 | 5 | 2 |
| 13-80 | 1 | | 5 | 3 |
| 3-120 [2] | 1 | 2 | 3 | 1 |
| 8-120 | | | 3 | 2 |
| 10-120 | 2 | 2 | 3 | 2 |
| 13-120 | | | 5 | 3 |

[1] 3-80 represents formula #3 using Vistanex B-80 instead of B-100. Like variation of the various formulas 8, 10, and 13 follows.
[2] 3-120 represents formula #3 using Vistanex B-120 instead of B-100. Like variation of the various formulas 8, 10, and 13 follows.

Table III below is an analysis of the distensibility characteristics of the different formulations:

TABLE III.—DISTENSIBILITY OF POLYISOBUTYLENE ANTIFOULING PAINTS

| Formula No. | Percent Distension | Paint Film | Surface of Paint |
|---|---|---|---|
| 1 | 0.5 | Cracking | |
| 2 | 1 | do | |
| 3 | 2 | Fine cracking | |
| 4 | 16 | | Crazing. |
| 5 | 22 | | No change. |
| 6 | 33 | | Do. |
| 7 | 2 | Cracking | |
| 8 | 1.5 | do | |
| 9 | 12 | | Crazing. |
| 10 | 10–15 | | Do. |
| 11 | 9 | | Do. |
| 12 | 0.5 | Cracking | |
| 13 | 1 | Fine Cracking | |
| 14 | 29 | do | Do. |
| 15 | 22 | do | Do. |
| 16 | 1 | Cracking | |
| 17 | 8 | Fine cracking | |
| 3A | 1.5 | do | |
| 6A | 10 | | Do. |
| 8A | 0.5 | Cracking | |
| 10A | 1.5 | Fine cracking | |
| 3B | 20 | | Do. |
| 6B | 28 | | No change. |
| 8B | 27 | | Crazing. |
| 10B | 23 | | Do. |
| 3-80 [1] | 20 | | No change. |
| 8-80 | 3 | Fine cracking | |
| 10-80 | 21 | | Crazing. |
| 13-80 | 10 | Fine cracking | |
| 3-120 [2] | 25 | | No change. |
| 8-120 | 26 | | Crazing. |
| 10-120 | 33 | | Do. |
| 13-120 | 20 | Fine cracking | |

[1] 3-80 represents formula #3 using Vistanex B-80 instead of B-100. Like variation of the various formulas 8, 10, and 13 follows.
[2] 3-120 represents formula #3 using Vistanex B-120 instead of B-100. Like variation of the various formulas 8, 10, and 13 follows.

Table IV below is an analysis of the pigment sedimentation characteristics of these different formulations:

TABLE IV.—PIGMENT SEDIMENT IN POLYISOBUTYLENE ANTIFOULING PAINTS—PAINTS STORED IN QUART CANS FOR TWENTY MONTHS

| Formula No. | Firmness of Sediment | Thickness of Sediment, cm. | Instron Penetration Resistance, lbs. | Redispersion, Time, Minutes | Viscosity, ku | Overall Rating |
|---|---|---|---|---|---|---|
| 1 | Firm | 2.1 | 33 | 10 | 89 | 4 |
| 2 | do | 1.4 | 18 | 10 | 88 | 4 |
| 3 | do | 1.1 | 7 | 10 | 89 | 3 |
| 4 | Soft | 0.9 | 3 | 5 | 99 | 2 |
| 5 | do | 0.4 | 1 | 0 | 100 | 1 |
| 6 | Very soft | 0.2 | 1 | 0 | 104 | 1 |
| 7 | Firm | 3.3 | 21 | 10 | 100 | 4 |
| 8 | do | 1.3 | 36 | 10 | 101 | 4 |
| 9 | Soft | 1.4 | 8 | 5 | 106 | 3 |
| 10 | do | 1.5 | 3 | 5 | 105 | 2 |
| 11 | Very soft | 0.7 | 2 | 0 | 107 | 1 |
| 12 | Hard | 4.4 | 49 | 10 | 119 | 4 |
| 13 | do | 2.5 | 40 | 15 | 115 | 5 |
| 14 | Firm | 2.3 | 20 | 10 | 111 | 4 |
| 15 | Very hard | 1.4 | >50 | >15 | 113 | 5 |
| 16 | Firm | 4.6 | 30 | 15 | 134 | 5 |
| 17 | Hard | 3.5 | 47 | 10 | 118 | 4 |
| 3A | Very soft | 0.4 | 2 | 0 | 101 | 1 |
| 6A | V. sl. sediment | 0.2 | 0 | 0 | 105 | 1 |
| 8A | Very soft | 0.7 | 2 | 0 | 101 | 1 |
| 10A | do | 0.5 | 1 | 0 | 107 | 1 |
| 3B | Hard | 1.8 | >50 | >15 | 101 | 5 |
| 6B | do | 1.1 | >50 | >15 | 103 | 5 |
| 8B | Very hard | 2.9 | >50 | >15 | 109 | 5 |
| 10B | do | 2.1 | >50 | 10 | 108 | 4 |
| 3-80 [1] | Firm | 1.5 | 27 | 10 | 98 | 4 |
| 8-80 | do | 2.1 | 28 | 10 | 101 | 4 |
| 10-80 | Hard | 1.8 | 37 | >15 | 103 | 5 |
| 13-80 | do | 2.9 | 50 | >15 | 112 | 5 |
| 3-120 [2] | Firm | 1.2 | 13 | 5 | 101 | 3 |
| 8-120 | do | 1.2 | 6 | 10 | 100 | 3 |
| 10-120 | do | 1.4 | 8 | 5 | 108 | 3 |
| 13-120 | Hard | 2.6 | 28 | >15 | 112 | 5 |

[1] 3-80 represents formula #3 using Vistanex B-80 instead of B-100. Like variation of the various formulas 8, 10, and 13 follows.
[2] 3-120 represents formula #3 using Vistanex B-120 instead of B-100. Like variation of the various formulas 8, 10, and 13 follows.

An analysis of these test results has led to the establishment of the following ranges as yielding satisfactory antifouling composition characteristics:

| Non-volatile Ingredients | Volatile Ingredients |
| --- | --- |
| Cuprous oxide, 82–97.5%. Vistanex, 1.7–10.5%. Rosin, 0%–15%. | Paint thinner (solvent) 20–130% of the non-volatile ingredients. |

(Percentages are by weight.)

Within the scope of broad application, and with particular view toward the use of the antifouling composition on rubber sonar domes, formula #10 is considered to have the optimum degree of the sought-for properties of high fouling resistance, flexibility, adherence and durability and adequate sound transparency. In terms of percentages, by weight, formula #10 is proportioned as follows:

| Non-volatile Ingredients | Volatile Ingredients |
| --- | --- |
| Cuprous oxide, 90.1%. Vistanex, 5.8%. Rosin, 4.1%. | Paint thinner (solvent) 73% of the non-volatile ingredients. |

(Percentages are by weight.)

The improved pigment suspension of the copper pigment-rosin-Vistanex composition obviates the control difficulty incurred with prior antifouling compositions such as Navy Standard 15 NRL.

Other solvents, such as xylene, may be employed in place of the paint thinner.

A recommended formulation procedure is as follows:

Add all the polyisobutylene resin (cut up into small pieces) and any inhibitor employed to nearly all the solvent to form a 7.5% resin solution. Unlike rubber, polyisobutylene resin should not be masticated before preparing the solution, as this causes degradation with resulting deterioration of mechanical properties. If rolls are used to draw the resin out in thin sheets before introduction into the solvent, mastication of the resin should be held to the very least possible amount, and the rolls should be held to about 150–200 degrees centigrade. Solution of the resin is a slow swelling process relatively independent of the rate of agitation. The minimum agitation which prevents settling and compaction of the resin is recommended. The cuprous oxide pigment is mixed with a portion of the 7.5% resin solution to make a mill paste which is then ground on a roller mill. The rosin is dissolved in the rest of the solvent. The mill paste, rosin solution, and rest of the 7.5% resin solution are blended to form the finished paint.

Two examples of formulations for coatings from a large series designed for extreme flexibility are the following.

|  | Parts by weight | |
| --- | --- | --- |
| Cuprous oxide | 270 | 360 |
| Vistanex B-100 | 5 | 20 |
| Naphthenic acid | 50 | 20 |

Another large series designed for extreme flexibility has been made by merely substituting Oppanol B-200 for Vistanex B-100 in the formulations of Table I.

As previously noted, it is a well known fact that certain antifouling toxics, such as cuprous oxide pigments, have a deleterious effect on some materials such as steel and certain rubbers, for example, natural rubber. Accordingly, when the antifouling compositions of this invention are made with such toxics it is contemplated to apply primers or protective undercoats to these sensitive materials before applying the antifouling compositions. These primers or undercoats protect the base surface, such as a steel hull or a rubber sonar dome and the like, from the corrosive or deleterious effect of the toxic by insulating the base surface from the toxic. Primers, as is well known, must adhere to the surface beneath as well as to that above and must be compatible with the coating applied over them.

Illustrative of the paint system incorporating the antifouling composition and primers are the following coatings which are applied to the to-be-coated surface in the sequence in which they are below-listed:

(1) One coat MIL-P-5054, Clear Elastomer Paint
(2) Three coats RP-151, polyisobutylene primer
(3) Two coats antifouling composition, preferably formula #10.

The first primer (MIL-P-5054) may consist of any elastomer primer suitable for rubber. Examples are "Clear Elastomer Paint" manufactured by Akron Paint and Varnish Company, and GACO N-29 (neoprene cement) manufactured by Gates Engineering Company. The clear elastomer is a natural rubber solution with a colorless pigment. A variety of natural rubber solutions or cements would be suitable. This first primer as a coating on the rubber also acts to increase the adhesion of the polyisobutylene paints.

The polyisobutylene primer (RP-151) serves as an excellent undercoat since it is flexible, adheres readily to rubber, and has good compatibility with copper-loaded paints. The following is an illustrative example of the composition of this primer:

| Ingredients: | Gallons per 100 gallons |
| --- | --- |
| Carbon black pigment | 1.90 |
| Polyisobutylene resin, Vistanex B-100 | 4.38 |
| Petroleum spirits (solvent) | 93.72 |
| Inhibitor (Deenax; Enjay Co.) | .004 |

The recommended formulation process for the polyisobutylene primer (RP-151) is as follows:

Add all the polyisobutylene resin (cut up into small pieces) and inhibitor to a portion of the petroleum spirits to form a 7.5% resin solution. Unlike rubber, polyisobutylene resin should not be masticated before preparing the solution, as this causes degradation with resulting deterioration of mechanical properties. If rolls are used to draw the resin out in thin sheets before introduction into the petroleum spirits, mastication of the resin should be held to the very least possible amount. Solution of the resin is a slow swelling process relatively independent of the rate of agitation. The minimum agitation which prevents settling and compaction of the resin is recommended. Charge one-third of the prepared 7.5% resin solution, an equal volume of solvent, and all the lamp-black into a steel ball mill. Mill to an eight grind. Blend mill charge with remainder of the 7.5% resin solution and the remainder of the paint thinner to obtain the specification paint. The mill loading may be altered for the purpose of controlling viscosity of mill charge. Grinding equipment other than the ball mill generally yields extremely flocculated products.

In addition to their other characteristics both of the aforementioned primers are sufficiently sound-transparent to supplement the antifouling composition in a paint system suitable for use on rubber sonar domes. These paints dry to a dense non-porous coating which readily transmits sound.

*Sprayable coatings*

The lower molecular weight variants of polyisobutylene are used according to the invention to produce antifouling coatings which are sprayable. For example, polyisobutylene of molecular weight 50,000 and below compounds into excellent coatings well adapted for easy spray application. A whole series of paints has been made by merely substituting Oppanol B-50 for the Vistanex B-100 of Table I. Two typical examples using the Vistanex MH product are given herewith.

|  | Parts by weight | |
|---|---|---|
| Cuprous oxide | 567.0 | 567.0 |
| WW Rosin | 63.0 | 36.0 |
| Vistanex MH | 30.4 | 53.2 |
| Xylol | 122.0 | 213.0 |
| Paint thinner | 21.0 | 12.0 |

The sprayable coatings exhibit better film characteristics for a given loading of toxic than other antifouling paints but they are adapted for use only on surfaces which are not subject to appreciable flexing such as hulls of vessels, since they are not flexible enough to use on surfaces subject to appreciable flexing.

Obviously many modifications and variations of the present invention are possible in the light of the above teachings. It is therefore to be understood that within the scope of the appended claims the invention may be practiced otherwise than as specifically described.

What is claimed is:

1. An antifouling composition adapted for ready application by spraying comprising antifouling toxic and polyisobutylene having an approximate average molecular weight not exceeding essentially 50,000.

2. The composition of claim 1 wherein the toxic comprises cuprous oxide.

3. An antifouling protective coating composition comprising, by weight, non-volatile ingredients comprising from about 82% to about 97.5% cuprous oxide, from about 1.7% to about 10.5% polyisobutylene, the approximate average molecular weight of which does not exceed essentially 50,000, from 0% to about 15% rosin, and volatile ingredients comprising solvent in an amount from about 20% to about 130% of the non-volatile ingredients.

References Cited by the Examiner
UNITED STATES PATENTS 3,033,809   5/1962   Saroyan et al. _____ 260—27

LEON J. BERCOVITZ, *Primary Examiner.*

J. ZIEGLER, F. McKELVEY, *Assistant Examiners.*